United States Patent [19]

Frentzel

[11] 4,438,018

[45] Mar. 20, 1984

[54] METAL CATALYZED PREPARATION OF POLYOXYALKYLENE SURFACTANTS FOR PHENOLIC FOAM STABILIZATION

[75] Inventor: Richard L. Frentzel, Clearwater, Fla.

[73] Assignee: The Celotex Corporation, Tampa, Fla.

[21] Appl. No.: 319,868

[22] Filed: Nov. 9, 1981

Related U.S. Application Data

[63] Continuation of Ser. No. 113,841, Jan. 21, 1980, abandoned.

[51] Int. Cl.$^3$ .................. B01F 17/32; B01F 17/36
[52] U.S. Cl. .................. 252/356; 252/DIG. 1; 428/305.5; 428/314.4; 521/136; 521/911; 525/326.9; 526/915
[58] Field of Search .................. 252/356; 521/911; 525/328; 526/915

[56] References Cited

U.S. PATENT DOCUMENTS

| | | | |
|---|---|---|---|
| 2,648,658 | 8/1953 | Vandenberg | 526/915 X |
| 2,842,528 | 7/1958 | Herbst, Jr. et al. | 526/915 X |
| 2,907,770 | 10/1959 | Mertz | 546/351 |
| 3,028,396 | 4/1962 | Albus et al. | 260/326.5 E |
| 3,222,329 | 12/1965 | Grosser et al. | 526/264 |
| 3,223,687 | 12/1965 | Crowe | 525/60 |
| 3,270,032 | 8/1966 | Erner | 260/326.5 E |
| 3,304,273 | 2/1967 | Stamberger | 521/88 |
| 3,376,236 | 4/1968 | Erner | 521/88 |
| 3,383,351 | 5/1968 | Stamberger | 260/33.2 R |
| 3,417,038 | 12/1968 | Soltys | 521/75 |
| 3,423,367 | 1/1969 | Merijan et al. | 252/331 X |
| 3,454,504 | 7/1969 | Murai et al. | 521/110 |
| 3,484,392 | 12/1969 | Wluka | 521/88 |
| 3,523,093 | 8/1970 | Stamberger | 521/88 |
| 3,563,963 | 2/1971 | Beier et al. | 526/93 |
| 3,746,663 | 7/1973 | Beale et al. | 521/137 |
| 3,767,602 | 10/1973 | Carroll et al. | 252/431 N X |
| 3,914,188 | 10/1975 | Carroll et al. | 521/94 |
| 3,914,190 | 10/1975 | Carroll et al. | 521/88 |
| 4,073,779 | 2/1978 | Wiest et al. | 526/258 X |
| 4,133,931 | 1/1979 | Beale et al. | 428/315 |
| 4,140,842 | 2/1979 | Beale et al. | 252/356 X |
| 4,247,413 | 1/1981 | Beale et al. | 252/356 |

FOREIGN PATENT DOCUMENTS

| | | | |
|---|---|---|---|
| 1351387 | 12/1963 | France | 526/291 |
| 1040452 | 8/1966 | United Kingdom | 521/914 |
| 1136326 | 12/1968 | United Kingdom | 526/915 |

OTHER PUBLICATIONS

Kharasch et al., J. Org. Chem., 17,207 (1952).
Kharasch et al., J. Org. Chem., 23,324 (1958).
Kharasch et al., J. Org. Chem., 24,72 (1959).
Kuryla et al., J. of Cellular Plastics, Mar. 1966, pp. 84–96.
Ravve: "Organic Chemistry of Macromolecules", p. 420, Marcel Dekker, Inc. (1967).
Meiya et al., Chem. Abstracts, vol. 77, 1972, p. 12, 20168d.
Indictor et al., J. of Paint Tech., 47(601),36 (1975).
Indictor et al., Macromolecules, 8,935 (1975).
Ceresa: "Block and Graft Copolymerization", vol. 2, p. 285, John Wiley & Sons.
Indictor et al., J. Poly. Science, Polmer Chem. Ed., 16,309 (1978).

Primary Examiner—Richard D. Lovering
Attorney, Agent, or Firm—James W. Grace; Charles W. Vanecek

[57] ABSTRACT

Polyoxyalkylene surfactants for cellular foams can be prepared by reacting under free radical polymerization conditions a polyoxyalkylene adduct, a cyclic nitrogenous vinyl monomer and an esterified unsaturated dibasic acid in the presence of an organic or inorganic percompound and a metal catalyst.

69 Claims, 2 Drawing Figures

METAL CATALYZED PREPARATION OF POLYOXYALKYLENE SURFACTANTS FOR PHENOLIC FOAM STABILIZATION

This is a continuation of application Ser. No. 113,841, filed Jan. 21, 1980, now abandoned.

BACKGROUND OF THE INVENTION

1. Field of the Invention

This invention relates to the preparation of novel surfactants and their utilization in producing cellular foam materials, particularly phenolic foams. The surfactants are prepared by reacting under free radical polymerization conditions a polyoxyalkylene adduct, a cyclic nitrogenous vinyl monomer and an esterified unsaturated dibasic acid in the presence of an organic or inorganic per-compound and a metal catalyst.

2. Description of the Prior Art

Phenolic polymers have been known for decades. More recently there has been increased interest in phenolic polymers which can be formed into cellular materials more commonly referred to as foams. These foams are produced by mixing reactants in the presence of a blowing agent. See, for example, Thomas et al. U.S. Pat. No. 2,744,875 (1956); Nelson Canadian patent No. 674,181 (1963); Dijkstra Canadian patent No. 684,388 (1964); Wissenfels et al. Canadian patent No. 866,876 (1971); United Kingdom Specification No. 498,642 (1948); Australian Patent No. 128,508 (1945); and Modern Plastics Encyclopedia, Volume 41, pages 362,363 (1964). However, most known cellular materials produced from phenolic polymers exhibit an unsatisfactory thermal conductivity initially. Other known cellular materials produced from phenolic polymers exhibit an undesirable increase in thermal conductivity with time.

U.S. Pat. No. 4,140,842 (1979) discloses improved phenolic foam materials made with phenol:o-cresol resoles, which are characterized by high thermal resistance and a relatively slow increase in thermal conductivity with time. These foams are produced utilizing a cell stabilizing surfactant which is the capped reaction product of an alkoxylated amine and a copolymerizable mixture of dialkyl maleate and N-vinyl-2-pyrrolidinone or N-vinyl caprolactam. The latter co-monomers are polymerized with a combination of the initiators azobisisobutyronitrile and t-butyl-perbenzoate. A disadvantage of these phenolic foams is that at higher phenol:o-cresol ratios, i.e., a deficiency of o-cresol, the cellular material produced tends to become coarse celled and too friable.

OBJECTS OF THE INVENTION

It is therefore an object of the present invention to provide a novel class of surfactants for use in preparing fine, closed-cell foam materials, particularly phenolic foams, and a method of producing the surfactants, as well as a method of producing the foams by use of the surfactants.

It is another object of the present invention to provide an improved closed cell phenolic-resin foam material substantially free of the disadvantages of prior foams and an improved laminated building panel employing the foam material.

It is still another object of the present invention to produce a closed cell phenolic-resin foam material with high thermal resistance and high insulation properties and a relatively slow increase in thermal conductivity with time.

It is a further object of the present invention to produce a phenolic-resin foam material which exhibits a high closed cell content without adversely affecting friability, compressive strength and the low flammability characteristics of the material.

It is a still further object of the present invention to provide a closed cell phenolic-resin foam material which can be used in building panels which are highly insulating, thermally resistant, low in friability, soundproof and self-supporting.

These and other objects and advantages of the present invention will become more apparent by reference to the following detailed description and drawings wherein:

BRIEF DESCRIPTION OF DRAWINGS

FIG. I is a cross-sectional view of a laminated building panel having one facing sheet; and FIG. II is a cross-sectional view of a laminated building panel having two facing sheets.

DESCRIPTION OF THE INVENTION

Figure 1:
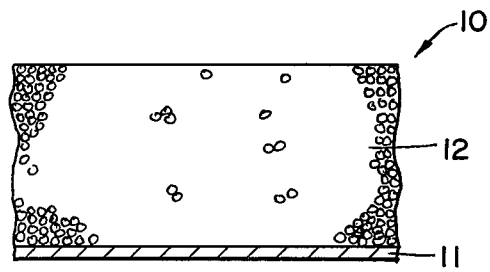
Figure 2:
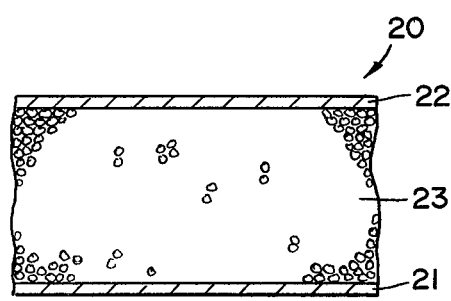

The above objects have been achieved and the drawbacks of the prior art have been overcome by the development of an improved surfactant for foam materials, particularly phenolic foams, which is the product of a metal catalyzed, free-radical initiated copolymerization of (a) a cyclic nitrogenous vinyl monomer and (b) an esterified unsaturated dibasic acid in the presence of a polyoxyalkylene adduct.

More particularly, the foam surfactant of the present invention comprises the reaction product of a metal catalyzed, free-radical initiated copolymerization of (a) a cyclic nitrogenous monomer having the formula

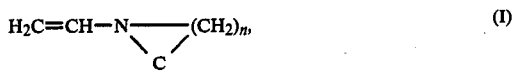

wherein n is 3, 4, or 5, and (b) an esterified unsaturated dibasic acid containing 4 or 5 carbon atoms in the acid portion conducted in the presence of a polyoxyalkylene adduct. In an advantageous embodiment of the invention, the copolymerization of the cyclic nitrogenous vinyl monomer and the esterified unsaturated dibasic acid is catalyzed by a redox system, consisting of a per-compound, preferably an organic peroxidic compound, used in conjunction with a redox metal catalyst(s), preferably a transition metal compound(s).

In the broadest aspects of the present invention, the polymerization of the cyclic nitrogenous vinyl monomer and esterified unsaturated dibasic acid can be conducted in the presence of any conventional polyoxyalkylene adduct. The polyoxyalkylene adduct can be represented by the structural formula

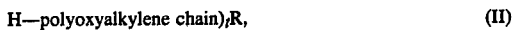

wherein R is an organic or inorganic radical and t is the number of polyoxyalkylene chains reacted onto the R backbone. Preferably, R is an organic radical selected from aromatic, aliphatic, cycloaliphatic, and heterocyclic radicals, and combinations of these, and t is an integer from 1 to 50, more preferably 1 to 8, most preferably 1 to 4. Included among the conventional polyoxyalkylene adducts which can be employed as starting materials are anionic, cationic and nonionic type surfactants. These surfactants may be used either alone or in admixture with each other. Non-ionic type surfactants are preferred.

Among the conventional polyoxyalkylene adducts which can be employed are the alkylene oxide adducts of:

(a) Mono- and polyhydroxyalkanes and mono- and polyhydroxycycloalkanes;
(b) Alkanolamines;
(c) Mono- and polyamines;
(d) Non-reducing sugars and sugar derivatives;
(e) Aromatic amine/phenol/aldehyde condensation products;
(f) Phosphorus and polyphosphorus acids;
(g) Mono- and polyhydric phenols;
(h) Amides;
(i) Organic carboxylic acids;
(j) Hydroxyl containing triglycerides;
(k) Polysiloxanes; and the like.

The adducts are prepared in known manner. Preferably, the alkylene oxides employed in the adduct formation have 2 to 4 carbon atoms, for example, ethylene oxide, 1,2-epoxypropane, the epoxybutanes, and mixtures thereof. Mixed propylene oxide-ethylene oxide adducts have proved especially useful. In the preparation of the latter adducts, the ethylene oxide and propylene oxide are advantageously reacted in the molar ratio of 10:90 to 90:10.

It has been found that the molecular weight and alkylene oxide content of the conventional polyoxyalkylene adducts can play an important role in determining the cell stabilizing capacity of the surfactants of the invention. More specifically, certain adducts have been found to require a minimum ethylene oxide content and molecular weight for more efficient cell stabilization. These requirements can vary for different polyoxyalkylene adducts and foam systems but it is possible to establish the satisfactory values for any given foam through routine experimentation.

Advantageously, the mono- and polyhydroxyalkanes and mono- and polyhydroxycycloalkanes to be alkoxylated for use in the present invention can have from 1 to 8 hydroxyl groups. Illustrative alcohols for alkoxylation include, among others, ethylene glycol, propylene glycol, 1,3-dihydroxypropane, 1,3-dihydroxybutane, 1,4-dihydroxybutane, 1,4-, 1,5-, and 1,6-dihydroxyhexane, 1,2-, 1,3-, 1,4-, 1,6- and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, xylitol, arabitol, sorbitol, mannitol, 3,4-dihydroxycyclopentane, tetramethylolcyclohexanol, cyclohexanediol, fatty alcohols, high molecular weight polyoxyalkylene glycols; and the like.

Another useful class of polyoxyalkylene adducts which can be employed are the alkylene oxide adducts of alkanolamines. Illustrative alkanolamines include ethanolamine, diethanolamine, triethanolamine, triisopropanolamine, and tributanolamine.

Another useful class of polyoxyalkylene adducts which can be employed are the alkylene oxide adducts of mono- and polyamines. Mono- and polyamines suitable for reaction with alkylene oxides include, among others, methylamine, ethylamine, isopropylamine, butylamine, benzylamine, aniline, the toluidines, naphthylamines, ethylenediamine, diethylene triamine, triethylenetetramine, 4,4'-methylenedianiline, 1,3-butanediamine, 1,3-propanediamine, 1,4-butanediamine, 1,2-, 1,3-, 1,4-, 1,5- and 1,6-hexanediamine, phenylenediamines, toluenediamine, naphthalenediamines, and the like.

A further class of polyoxyalkylene adducts which can be employed are the alkylene oxide adducts of the nonreducing sugars and the nonreducing sugar derivatives. Among the nonreducing sugars and sugar derivatives contemplated are sucrose, alkyl glycosides such as methyl glucoside, ethyl glucoside, and the like, glycol glycosides such as ethylene glycol glucoside, propylene glycol glucoside, glycerol glycoside, and the like.

A still further useful class of polyoxyalkylene adducts are the alkylene oxide adducts of mono- and polyhydric phenols, including mononuclear dihydroxy benzenes, higher alkyl phenols, and polyphenols. Among the phenols which can be used are found, for example, catechol, resorcinol, orcinol, nonylphenol, bisphenol A, bisphenol F, condensation products of phenol and formaldehyde, more particularly the novolac resins, condensation products of various phenolic compounds and acrolein, the simplest members of this class being the 1,2,3-tris(hydroxyphenyl) propanes, condensation products of various phenolic compounds and glyoxal, glutaraldehyde, and other dialdehydes, the simplest members of this class being the 1,1,2,2-tetrakis(hydroxyphenyl) ethanes, and the like.

Another desirable class of polyoxyalkylene adducts are the alkylene oxide adducts of aromatic amine/phenol/aldehyde condensation products. The condensation products are prepared by condensing an aromatic amine, for instance, aniline, toluidine, or the like, a phenol such as phenol, cresol, or the like, and an aldehyde, preferably formaldehyde, at elevated temperatures in the range of, for example, from 60° C. to 180° C. The condensation product is then recovered and reacted with alkylene oxide, using a basic catalyst (e.g., potassium hydroxide) if desired, to produce the adducts.

The alkylene oxide adducts of phosphorus and polyphosphorus acids are another useful class of polyoxyalkylene adducts. Phosphoric acid, phosphorous acid, the polyphosphoric acids such as tripolyphosphoric acid, the polymetaphosphoric acids, and the like are desirable for use in this connection.

Examples of commercially available polyoxyalkylene adducts for use in the present invention include Polyglycol 15-200 from Dow Chemical Company, Flo Mo 36 C and 5D from Sellers Chemical Corporation, ethoxylated sorbitan esters from Imperial Chemical Industries and Pluronics from BASF Wyandotte Corporation.

Cyclic nitrogenous monomers which can be employed in the preparation of the cell stabilizers of the present invention are N-vinyl-2-pyrrolidinone, N-vinyl-2-caprolactam and N-vinyl-2-piperidone, preferably N-vinyl-2-pyrrolidinone.

In an advantageous embodiment of the invention, the ester of the unsaturated dibasic acid used in preparing the cell stabilizers of this invention corresponds to the formula:

$$C_uH_{2u-2}(CO_2C_vH_{2v+1})_2 \quad \text{(III)}$$

wherein u is 2 or 3 and v is an integer from 3 to 18, more preferably 3 to 6. Typical examples of the esters that may be used include dibutyl fumarate, dibutyl maleate, dihexyl fumarate, diamyl methylenemalonate, dipropyl itaconate, dibutyl itaconate, dimethylamyl maleate, diisooctyl maleate, dipentyl maleate, dihexyl maleate, dioctyl maleate, and ditridecyl maleate, preferably dibutyl maleate.

Among the per-compounds which may be used in the free radical initiated copolymerization of the cyclic nitrogenous vinyl monomer and ester are those inorganic per-compounds which are customarily employed in redox catalyst systems, such as hydrogen peroxide; alkali metal persulfates such as sodium persulfate, potassium persulfate, ammonium persulfate; alkali metal perborate; as well as organic per-compounds, particularly organic peroxides and hydroperoxides, such as tertiary-butyl perbenzoate, tertiary-butyl hydroperoxide, cumene hydroperoxide, di-tertiary-butyl peroxide, acetyl peroxide, benzoyl peroxide, lauroyl peroxide, and 2,4-dichlorobenzoyl peroxide. The efficiency of the per-compounds is conditioned upon their being sufficiently active under the polymerization conditions employed. The per-compounds are utilized in amounts sufficient to initiate the free radical polymerization of the invention. Particular conditions affecting their efficiency are the copolymerization temperature (in the range from about 30° to about 140° C.), and the nature of the specific metal catalyst(s) present and the adduct(s) being modified. For example, the solubility of the metal catalyst and/or the per-compound in the copolymerization medium can influence the surfactant preparation. A limited solubility of a particular metal catalyst and/or per-compound in a given reaction mixture may rule out use of the substance(s) in that mixture. It has also been found that use of an azo initiator such as azobisisobutyronitrile in the copolymerization reaction of the invention can have a detrimental effect on the stabilizing capacity of the copolymerization product.

In the broadest aspects of the present invention, the nitrogenous monomer/ester/polyoxyalkylene adduct polymerization may be conducted in the presence of any metal which can interact with the per-compound free radical initiator so as to produce a cell stabilizing surfactant of the invention. For example, suitable metals may be selected from those known to be capable of shortening the half-lives of free radical initiators. The metal compounds are utilized in catalytically effective amounts. Excellent catalytic properties are found to be possessed by transition metal compounds, especially those wherein the metal is a transition metal having an atomic number of 21 to 30, as e.g., compounds of iron, manganese, cobalt, copper, vanadium, etc. Both inorganic and organic metal salts and organometallics have been found to be effective. The free radical polymerization can be conducted utilizng metals in single oxidation states, as well as metals in combinations of two different oxidation states.

Examples of useful metal catalysts having a single oxidation state are copper (II) acetylacetonate, iron (II) acetylacetonate, iron (III) acetylacetonate, and the like. Examples of mixtures of metal catalysts of different oxidation states for use in the copolymerization of the invention are iron (II) sulfate and iron (III) sulfate; iron (II) sulfate and iron (III) chloride; manganese (II) acetylacetonate and manganese (III) acetylacetonate; cobalt (II) benzoate and cobalt (III) acetylacetonate; copper (I) acetate and copper (II) acetylacetonate; vanadium (III) acetylacetonate and vanadium (IV) oxide acetylacetonate; and the like.

Especially advantageous organometallic compounds for use as catalysts in preparing the cell stabilizing surfactants of this invention are ferrocenes and their analogs such as ferrocene, acetylferrocene, benzoylferrocene, cobaltocene, 1,1'-diacetylferrocene, 1,1'-ferrocenebis-(diphenylphosphine), nickelocene, hafnocene dichloride, and ferrocenecarboxaldehyde. Ferrocene is preferred.

Surfactants having outstanding cell stabilizing properties are obtained from a free radical copolymerization wherein a combination of ferrocene and tert.-butyl perbenzoate is utilized.

The free radical initiated copolymerization of this invention can be conducted under known polymerization conditions, using, e.g., solution, bulk, emulsion, or suspension polymerization techniques. Bulk polymerization has been found especially useful.

The free radical copolymerization is advantageously carried out by mixing the reactants, metal catalyst(s) and initiator(s) at temperatures from about 30° to about 140° C. under an inert atmosphere such as that provided by nitrogen and like inert gases until polymerization is complete. Polymerization is continued until the monomers are consumed, as detected by conventional analytical methods, such as gel permeation chromatography. Polymerization times of 1 or more hours can be expected.

The initiator(s) and metal catalyst(s) can be added at the beginning of the polymerization or can be added portionwise at intervals during the course of polymerization. Similarly, the polyoxyalkylene adduct, cyclic nitrogenous vinyl monomer and esterified unsaturated dibasic acid can be brought together at the beginning of the polymerization or can be combined in increments as polymerization proceeds, such as by the gradual and simultaneous addition of each of the monomers to a resin kettle containing the adduct. It has been found disadvantageous to carry out a homopolymerization of the nitrogenous monomer to the adduct.

In a preferred embodiment of the invention the cyclic nitrogenous vinyl monomer and unsaturated diester monomer together constitute between about 5 and 40, more preferably 15 and 25, weight percent of the copolymerization reaction mixture. The cyclic nitrogenous vinyl monomer and unsaturated diester together comprise about 20 weight percent of the copolymerization reaction mixture in a most advantageous and preferred embodiment of the invention. The preferred molar ratio of cyclic nitrogenous vinyl monomer to unsaturated diester in the reaction mixture is 1:1. The concentration of per-compound initiator(s) in the mixture is advantageously within the range of about 2 to 30 weight percent, preferably 4 to 25 weight percent, based on the total weight of monomers. Generally, the metal catalyst(s) is utilized at a level of 0.001 to 0.1 grams per gram of initiator. Preferably, 0.001 to 0.06 grams of metal catalyst(s) per gram of initiator are used.

The molecular weight of the conventional polyoxyalkylene adduct to be copolymerized can vary over a wide range. However, if the molecular weight is too low, the foam prepared with the subsequently prepared copolymerization product gives coarse cells. No comparable limitation has been found in the case of conventional polyoxyalkylene adducts of high molecular weights. The latter adducts can be utilized in the highest molecular weights currently available to yield fine-celled foams in accordance with the present invention. As previously indicated, the suitable molecular weight and alkylene oxide content for any particular adduct and foam system is readily determinable by those skilled in the art. In general, the starting material alkoxylated adduct will have a molecular weight of above about 1000, and advantageously in the range of approximately 2000 to 12,000. The molecular weight can be determined from the equation:

$$M.W. = (56.1 \times 1000 \times f / OH)$$

where
- M.W. = molecular weight of the polyoxyalkylene adduct
- f = functionality, that is, average number of hydroxyl groups per molecule of polyoxyalkylene adduct
- OH = hydroxyl number of the polyoxyalkylene adduct.

It is desirable that the conventional polyoxyalkylene adduct used in the present invention be treated with a suitable agent to cap its hydroxyl groups. Suitable capping agents are those organic compounds capable of reacting with compounds containing active hydrogen groups, such as hydroxyl groups, as determined by the Zerewitinoff method. The capping agents convert the hydroxyl groups of the polyoxyalkylene adduct to groups which are substantially chemically inert in the cellular foam-forming mixtures of the invention. The capping reaction takes place under conditions well known in the art; as, for example, described in Sandler, S. R. and Karow, "Organic Functional Group Preparations," Organic Chemistry, A Series of Monographs Edited by A. J. Blomquist, Academic Press, New York and London, 1968 Edition, pages 246-247, 1971 Edition, Vol. II, page 223 and 1972 Edition, Vol. III, page 13, the descriptions of which are incorporated herein by reference. The capping treatment may take place either before or after the copolymerization. Suitable capping agents include organic acids, acid anhydrides, acid chlorides, and acyloxy chlorides, such as a lowera alkyl monocarboxylic acid having 1 to 10 carbon atoms selected from the group consisting of acetic acid, propionic acid, butyric acid, hexanoic acid, octanoic acid, decanoic acid, isomers of these acids, anhydrides of these acids, acid chloride derivatives of these acids and mixtures thereof. Acetic anhydride is readily obtainable and convenient to use. Similarly, aromatic acids, anhydrides and chlorides can be employed. Benzoyl chloride and substituted products of it such as 3,5-dinitrobenzoyl chloride are examples of these. Alkyl and aromatic isocyanates can also be employed. Other factors, such as solubility in the polyoxyalkylene adduct being treated and the solubility of the capped and metal catalyzed surfactant in whatever resin system is to be stabilized, are considerations of which a practitioner in the art is cognizant in selecting the capping system which will yield the desired closed cell stabilized foam. Examples of suitable capping agents are acetic acid, acetic anhydride, acetyl chloride and 3,5-dinitrobenzoyl chloride. The preferred capping agent is acetic anhydride. The capping treatment is typically performed at temperatures ranging from 50° to 140° C. and is advantageously carried out until the surfactant has a hydroxyl value of less than 50, and preferably less than 10. The hydroxyl number is determined by the ASTM-D 1638 test.

One of the preferred surfactants produced by the metal catalyzed process of the present invention is the capped reaction product of an alkoxylated amine having the formula:

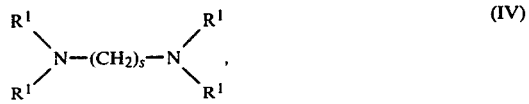

wherein $R^1$ is independently an alkoxylated chain having the formula:

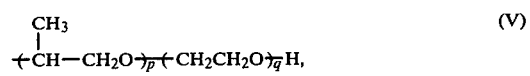

s is an integer from 2 to 10 inclusive and the ratio p:q is from 10:90 to 90:10, which amine has been reacted with a copolymerizable mixture of dialkyl maleate and a member selected from the group consisting of N-vinyl pyrrolidinone and N-vinyl caprolactam, the alkyl of the maleate having 3 to 18 carbon atoms. The preferred dialkyl maleate is dibutyl maleate.

The alkoxylation is carried out in a known manner using a mixture of ethylene oxide and propylene oxide in the molar ratio of 10:90 to 90:10 and preferably from 40:60 to 60:40. The molecular weight of the alkoxylated amine is from 1500 to 12,000 and preferably from 2500 to 6000. If the molecular weight of the alkoxylated amine is less than 1500, foam collapse can occur. The viscosity of an alkoxylated amine of molecular weight higher than 6000 can prove too great for the foam system to be practical.

The preferred molar ratio of dibutyl maleate and N-vinyl-2-pyrrolidinone to be reacted with the above alkoxylated amine of formula IV is 1:1, the mixture of dibutyl maleate and N-vinyl-2-pyrrolidinone comprising between 5 and 40 weight percent of the reaction mixture, and preferably 20 weight percent of the reaction mixture. N-vinyl-2-pyrrolidinone and N-vinyl caprolactam are interchangeable in equivalent quantities, but N-vinyl-2-pyrrolidinone is preferred. The alkoxylated amine/dibutyl maleate/N-vinyl-2-pyrrolidinone reaction product is capped by reacting it with acetic anhydride.

Instead of employing branched polyols, such as the alkoxylated amine of formula IV above, as the polyoxyalkylene adduct of the invention, linear polyols may advantageously be used. Examples of such adducts are the linear polyols based on propanediols, supplied under the name "Pluronics" by BASF Wyandotte Corporation. Pluronic polyols are block copolymers of ethylene oxide and propylene oxide. One type of Pluronics consists of a central block of propylene oxide units with ethylene oxide blocks on each end. For any particular polyol series of this type, propylene oxide is added to 1,2-propanediol to attain a desired chain length and then various levels of ethylene oxide are added to achieve the desired ethylene oxide:propylene oxide ratio. Another type of Pluronic are the Pluronic R series of polyols wherein ethylene oxide is first polymerized onto 1,3-propanediol, followed by the polymerization of propylene oxide onto the resulting ethoxylated structure. The alkoxylation of the Pluronics is carried out in a known manner. Phenolic foams of excellent quality can be made by employing metal catalyzed surfactants from Pluronics having molecular weights of 2000 or more and ethylene oxide contents of 30 weight percent or above, particularly within the range of from 30 to 80 weight percent. No upper limit in the polyol molecular weight has been observed for the Pluronics in the present invention.

The metal catalyzed copolymerization of the invention is capable of producing cellular foam stabilizing surfactants. By cellular foam stabilizing surfactants are meant those which keep the foam from collapsing and rupturing. Surfactants obtained from the metal catalyzed copolymerization of the invention are found to be especially useful cell stabilizers in phenolic foams. They have the capability of giving fine-celled, low k-factor foams even in those phenolic foams of U.S. Pat. No. 4,140,842 which contain a relatively high phenol:o-cresol ratio. The enhanced cell stabilizing efficiency of these surfactants is believed to be attributable to the activity of the metal catalyst(s) in increasing the number of monomer units which copolymerize onto the polyoxyalkylene adduct over the number added in the uncatalyzed copolymerization. Although it appears that the role of the metal may be to catalyze perester decomposition, the metal may play other functions, as, e.g., activating the monomer double bonds or inhibiting the formation of undesired side products.

The metal catalyzed surfactants of the present invention can be utilized directly in the production of fine-celled phenolic foams having high phenol:o-cresol ratios without subjecting the surfactants to the additional separation procedures disclosed in applicant's copending U.S. patent application Ser. No. 113,909, entitled "Extraction of Polyoxyalkylene Surfactants for Phenolic Foam Stabilization," and filed on the same date as this application, and now abandoned. The disclosure of this copending application is incorporated herein by reference. While metal catalyzed reaction products of the present invention display an exceptional phenolic foam stabilizing capacity without the need for any special isolation step, the same separation techniques described in applicant's copending application can be applied to these metal catalyzed surfactants with the result that a major, phenolic foam cell stabilizing component is again isolated. However, a greater amount of this major component is obtained by performing the separation step on the metal catalyzed reaction product than on the uncatalyzed one. Analysis of the metal catalyzed copolymerization reaction product reveals that its major component essentially comprises a product formed from the reaction of the cyclic nitrogenous vinyl monomer and unsaturated diester onto the polyoxyalkylene adduct. Isolation of this major component from the reaction mixture can be accomplished utilizing various conventional separation techniques such as fractional precipitation, selective extraction, and selective precipitation. Chromatography and ultracentrifugation can also be very useful.

One such separation method consists in a solvent extraction of the minor component from the bulk of the product mixture. The copolymerization reaction product is mixed with a solvent for said minor component, the mixture preferably being heated, and the solvent layer is thereafter separated from the resultant insoluble residue, as by decantation of the solvent layer after settling of the mixture. Typically, the concentration of the copolymerization reaction product in the solvent washing medium is from 5% to 25% by weight. The insoluble residue, after removal of small amounts of solvent (e.g., by evaporation), yields a purified surfactant having exceptional phenolic foam stabilizing properties. The solvent washing can be performed in a single step or can be repeated until little or no soluble material is extracted from the insoluble residue, with each solvent treatment typically lasting less than an hour.

Any solvent can be employed in the solvent extraction which will selectively dissolve away all components of the copolymerization reaction product except for its major component. A slight solubility of the major component in the extracting solvent does not seriously impair the overall extraction process. It is, of course, understood that in practice the remaining, non-phenolic foam stabilizing components would also be utilized. One use found for these components is as cell stabilizing surfactants in isocyanurate-containing foams and urethane foams. The solvent extraction can alternately be carried out by employing a suitable solvent which selectively dissolves away the phenolic foam stabilizing portion from the remainder of the product mixture.

A preferred class of solvents for dissolving away the minor components of the copolymerization reaction product are low-boiling point liquids, such as hydrocarbons, halogenated hydrocarbons, or mixtures thereof. Suitable low-boiling liquids are those having boiling points in the range of about 35° to 80° C. The solvent extraction is conveniently carried out at the boiling point of the solvent. Examples of solvents which can be used are hexane, n-butyl chloride, pentane, mixed hexanes, heptane, cyclohexane, etc.

It has further been discovered that improved phenolic foam surfactants can be prepared by another method which does not require the addition of a metal catalyst to the above-described copolymerization reactants. In accordance with this further method, the cyclic nitrogenous vinyl monomer, esterified unsaturated dibasic acid monomer and polyoxyalkylene adduct are reacted together under free radical polymerization conditions in the presence of a conventional free-radical peroxidic initiator(s) which is used in a greater than customary amount. The use of this increased initiator concentration unexpectedly results in the production of a surfactant which can satisfactorily stabilize the phenolic foams of U.S. Pat. No. 4,140,842 having a relatively high phenol:o-cresol ratio. Examples of free-radical initiators for use in this process are organic peroxides and hydroperoxides, such as tertiary-butyl perbenzoate, tertiary-butyl hydroperoxide, cumene hydroperoxide, di-tertiarybutyl peroxide, acetyl peroxide, benzoyl peroxide, lauroyl peroxide, and 2,4-dichlorobenzoyl peroxide, preferably tertiarybutyl perbenzoate. Azo initiators, such as azobisisobutyronitrile, whether used alone or in combination with peresters, result in the formation of surfactants not capable of giving fine-celled foams in high phenolic content resins. Presumably, the azo initiators do not promote the reaction of the vinyl monomers with the adduct.

Except for the higher than normal initiator level, this free radical copolymerization can be conducted under known polymerization conditions and all the process conditions described above for the metal catalyzed copolymerization of the invention are also applicable to it with the exception of the initiator level and the presence of a metal catalyst. The initiator is advantageously used in an amount greater than 2% by weight, preferably within the range of from 4% to 25% by weight (e.g., 10 to 14 weight percent), based on the total weight of the monomers. Very high initiator levels, as e.g., 12 weight percent or higher (based on the weight of the monomers) may be used to advantage in this process. Although the surfactants prepared using a high concentration of a perester such as tertiary-butyl perbenzoate are generally satisfactory for all phenolic foams, the addition of a metal catalyst to the perester will form an even more efficient surfactant.

The surfactant, whether obtained directly from the metal catalyzed copolymerization or from the copolymerization conducted in the presence of a high initiator level or after a subsequent separation process, is employed in a cell stabilizing amount in the foam-forming composition of the invention. Generally, the surfactant comprises from 0.05 to 10, and preferably comprises from 0.1 to 6, weight percent of the composition. Too little surfactant fails to stabilize the foam and too much surfactant is wasteful. Those surfactants which are branched, non-ionic, and capped are particularly good cell stabilizers.

The metal catalyzed surfactant of the present invention is particularly useful in the production of a closed-cell cellular composition comprising a phenolic resin and blowing agent in addition to the surfactant. Phenolic resin foams are a well-known class, phenol-aldehyde resin foams being representative and proportions of blowing agent and catalyst components being well known in the art.

Foams of low friability can be obtained by using a preferred phenolic polymer described in Moss U.S. Pat. No. 3,876,620. The preferred phenolic polymer is an alkylol group containing phenolic polymer of the formula:

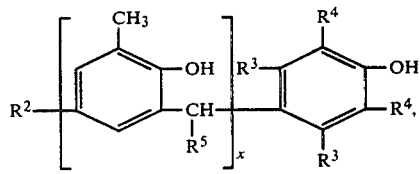

wherein $R^2$ is

hydrogen or a radical of the formula:

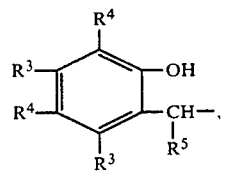

The $R^3$'s are independently selected from the group consisting of lower alkyl, preferably of 1 to 4 carbon atoms, phenyl, benzyl, halo, preferably chloro, bromo, or fluoro, nitro, and hydrogen. The $R^4$'s are independently selected from the group consisting of

hydrogen, or a radical of above Formula VII.

The $R^5$'s are independently selected from the group consisting of lower alkyl, preferably of 1 to 4 carbon atoms, hydrogen, phenyl, benzyl, or furyl. By furyl is meant the radical introduced by the use of furfural. In above Formula VI, x is an integer from 2 to 10 inclusive and is preferably an integer from 2 to 6 inclusive. When x is less than 2, a foam produced from such a phenolic polymer tends to have too high a friability. On the other hand, as x exceeds 10, the viscosity of the polymer increases to the point where it is difficult to process the foam. The phenolic polymers of the present invention generally have a molecular weight between 200 and 2,000 and preferably have a molecular weight between 300 and 1,500. At lower molecular weights, the resultant foams tend to have too high a friability, whereas at high molecular weights the viscosity of the phenolic polymer, even when a solvent is present, tends to be too high to permit processing.

A preferred subclass of phenolic polymers are those of the formula:

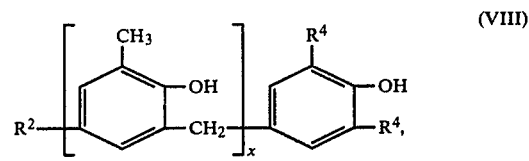

wherein $R^2$ is $HOCH_2$—, hydrogen or a radical of the formula:

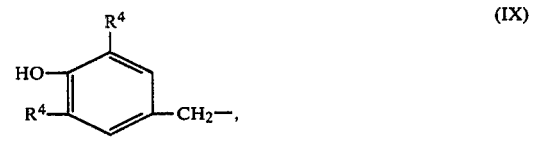

The $R^4$'s in above Formulas VIII and IX are independently selected from the group consisting of $HOCH_2$—, hydrogen or a radical of above Formula IX.

In a preferred embodiment of the present invention, at least one of the $R^4$'s is methylol, i.e., $HOCH_2$—. This is to ensure that there will be cross-linking sites on the phenolic polymer. Of course, it is well known in the art that such methylol groups or, when the aldehyde is other than formaldehyde, alkylol groups, are automatically introduced into the polymer by the process described below.

In the broadest aspects of the present invention, the phenolic polymer can contain widely varying ratios of the radicals of Formula VII or IX to ortho-cresol units. However, this ratio is generally from 1:3 to 10:1 and is preferably from 1:1 to 4:1. At higher ratios, i.e., a deficiency of ortho-cresol, the cellular material produced from such a phenolic polymer tends to be too friable. In determining the above ratios, one must include the radicals of Formula VII or IX present in Formula VI or VIII, respectively. The phenolic polymers of the invention can be synthesized by the methods described in U.S. Pat. No. 3,876,620, the teachings of which are incorporated herein by reference.

The phenolic compositions useful in the present invention generally comprise the phenolic polymer of Formula VI or Formula VIII, together with a compound of the formula:

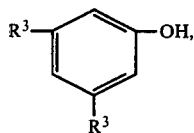

(X)

wherein the R³'s are independently selected from the group consisting of lower alkyl, preferably of 1 to 4 carbon atoms, phenyl, benzyl, halo, preferably chloro, bromo, or fluoro, nitro, and hydrogen.

The compound of Formula X can be present in the phenolic composition in widely varying ratios of Compound X to the polymeric composition but is generally present in a weight ratio of 1:30 to 1:2 and is preferably present in a weight ratio of 1:20 to 1:5. Examples of suitable compounds of Formula X include among others: m-cresol, m-chlorophenol, m-nitrophenol, 3,5-xylenol, and phenol, i.e., hydroxy benzene. Phenol is the most preferred compound of Formula X because of cost, availability, and reactivity. The phenolic polymers of Formula VI and Formula VIII are produced according to the present invention by combining the reactants in a two-step process described in Moss, U.S. Pat. No. 3,876,620.

In the broadest aspects of the present invention, any aldehyde can be employed to produce useful phenolic polymers. Examples of suitable aldehydes include, among others, furfural, formaldehyde, benzaldehyde, and acetaldehyde. Formaldehyde is the preferred aldehyde. Formaldehyde can be employed in widely varying forms such as the 37% aqueous solution widely known as formalin. However, it is generally necessary to remove from the polymeric material the water introduced with the formalin. Formaldehyde is preferably employed in the form of paraformaldehyde which contains much less water.

The cellular material of the present invention is formed by simply reacting the alkylol group containing phenolic polymer of Formula VI of Formula VIII and the compound of Formula X under conditions such that a cellular product will result. As is well known in the phenolic foam art, the reaction can be conducted in the presence of a foaming catalyst, a blowing agent, and a surfactant. The reaction can be performed between temperatures of 10°–50° C., preferably 15°–25° C., and conveniently at atmospheric pressure. The cellular materials of the present invention generally have a thermal conductivity, k-factor value of from 0.1 to 0.3, and preferably from 0.1 to 0.2 Btu/hr-°F.-sq. ft. per inch as measured at 24° C. The k-factor value is measured on a Model 88 machine supplied by the ANACON Company. The friability of the cellular material is 20% or less. Friability is the propensity of the foam to break expressed in percent weight loss. This is determined by the ASTM C-421 friability test conducted for 10 minutes.

In the broadest aspects of the present invention, any catalyst which will enhance the cross-linking and foaming reaction can be employed in the present invention. However, the preferred foaming catalysts are aromatic sulfonic acids, examples of which include, among others, benzene sulfonic acid, toluene sulfonic acid, xylene sulfonic acid, and phenol sulfonic acid. Phosphoric acid can also be employed either alone or in admixture with the sulfonic acids. The preferred sulfonic acid is a mixture of equal parts by weight of toluene sulfonic acid and xylene sulfonic acid, as described in Mausner et al. U.S. Pat. No. 3,458,449. Another foaming catalyst which has been found to give excellent results is a blend of toluene sulfonic acid, phosphoric acid, and water in a weight ratio of 35-50:50-35:15.

The catalyst is generally present in the minimum amount that will give the desired cream times of 10 to 120 seconds and firm times of 40 to 600 seconds to the reacting mixture. The catalyst, however, generally comprises from 0.5 to 20, and preferably comprises from 1.0 to 15, weight percent, based on the weight of the cellular material.

Any blowing agent characteristically employed in similar prior art products, such as is described in Moss et al., U.S. Pat. No. 3,968,300, can be employed in the composition of the present invention. In general, these blowing agents are liquids having an atmospheric pressure boiling point between minus 50° and 100° C. and preferably between zero and 50° C. The preferred liquids are hydrocarbons or halohydrocarbons. Examples of suitable blowing agents include, among others, chlorinated and fluorinated hydrocarbons such as trichlorofluoromethane, $CCl_2FCClF_2$, $CCl_2FCF_3$, diethylether, isopropyl ether, n-pentane, cyclopentane, and 2-methylbutane. Combinations of trichlorofluoromethane plus 1,1,2-trichloro-, 1,2,2-trifluoroethane, are the preferred blowing agents. The blowing agents are employed in an amount sufficient to give the resultant foam the desired bulk density which is generally between 0.5 and 10, and preferably between 1 and 5 pounds per cubic foot. The blowing agent generally comprises from 1 to 30, and preferably comprises from 5 to 20 weight percent of the composition. When the blowing agent has a boiling point at or below ambient, it is maintained under pressure until mixed with the other components. Alternatively, it can be maintained at subambient temperatures until mixed with the other components.

The cellular phenolic product formed by using the metal catalyzed surfactant of the invention has a uniform, fine-celled structure. Uniformity of cells is determined by visual and microscopic examination. This property of producing a fine-celled foam is tested by mixing 2 to 5% of the surfactant with the phenolic composition and producing a foam as described herein.

The average cell size diameter should ideally be less than 0.2 mm and is more preferably less than 0.1 mm (ASTM D-2842). Fine-celled foams can by the means set forth in the invention be rendered closed cells. The blowing agent is then trapped in the cells. One means of expressing the containment in the cells of the blowing agent is by use of the k-factor drift value. Unfaced cellular materials containing fluorocarbon gas have initial k-factors in the vicinity of 0.1–0.2 at 24° C. This low value increases over a period of months or sometimes days. The change is expressed as the k-factor drift. The k-factor is measured at a mean temperature of 24° C. The value is redetermined at various time intervals up to about 1000 days. A material exhibiting fast k-drift will attain a k-factor (BTU/hr-°F.-ft² per inch thickness) of at least 0.2 within 25 days. A slow k-drift material may require between 200 days and over two years to attain a 0.2 value. Any material which possesses a k-value under 0.2 will provide high thermal resistance. Obviously, the longer this value or a lower value is maintained, the better the efficiency.

Ball, Hurd, and Walker have published a comprehensive discussion of k-factor changes as a function of time. ("The Thermal Conductivity of Rigid Urethane Foams", J. Cellular Plastics, March/April, 1970, pp 66-78). F. Norton ("Thermal Conductivity and Life of Polymer Foams", J. Cellular Plastics, January, 1967, pp 23-37) has shown that diffusion of fluorocarbon gases out of unfaced foam and infusion of air into the foam causes an increases in k-factor. A slow k-drift foam is defined as one that attains a k-factor at 24° C. of 0.15-0.17 after 200-400 days and then remains below 0.2 k-factor for 5-10 years. Eventually all fluorocarbon diffuses from the foam to leave a closed cell material which contains only air in the cells.

The k-factor for the closed cell foam containing only air falls in the range of 0.22-0.26 BTU/hr-°F.-ft$^2$ per inch thickness at 24° C. for the 2-3 lbs/ft$^3$ density range. Therefore, if a foam exhibits greater than 0.2 k-factor after a short period of time (less than 25 days), then substantially all fluorocarbon has diffused from the foam and has been replaced by air. On the other hand, if the k-factor remains below 0.2 for at least 100 days, then a substantial amount of fluorocarbon gas remains in the closed cells of the foam in spite of infusion of air.

It has been found that use of the metal catalyzed surfactant of the invention results in a fine-celled phenolic foam with high closed cell content, a low initial k-factor and a low k drift value.

Referring now to the drawings, and in particular to FIG. I, there is shown a laminated building panel 10 of the invention. The building panel 10 comprises a single facing sheet 11 having thereon a cellular material 12 of the present invention. FIG. II shows a building panel 20 having two facing sheets 21 and 22 on either side of a cellular material 23.

Any facing sheet previously employed to produce building panels can be employed in the present invention. Examples of suitable facing sheets include, among others, those of kraft paper, aluminum, and asphalt impregnated felts, as well as laminates of two or more of the above.

The foam materials of the invention can also be used, with or without a facer(s), for pipe insulation.

The invention is further illustrated by the following examples in which all parts and percentages are by weight unless otherwise indicated. These non-limiting examples are illustrative of certain embodiments designed to teach those skilled in the art how to practice the invention and to represent the best mode contemplated for carrying out the invention.

EXAMPLE 1

This example illustrates the preparation of metal catalyzed surfactants in accordance with the present invention.

0.33 g of ferrocene was added to 200 g (0.036 mole) of ethoxylated propoxylated ethylene diamine (Tetronic 704) in a 500 ml resin kettle equipped with an overhead stirrer. A nitrogen stream was provided through the resin kettle. A solution containing 6 g (0.032 mole) of tert.-butyl perbenzoate (TBP) dissolved in 34 g (0.145 mole) of dibutyl maleate (DBM) was added slowly over two hours to the polyol from an addition funnel. At the same time, 16 g (0.145 mole) of N-vinyl-2-pyrrolidinone (NVP) was slowly added to the polyol from a second addition funnel. During the addition, the reaction mixture was maintained at 90° C. After the addition, the temperature of the reaction mixture was increased to 140° C. for one hour and then allowed to cool to room temperature. Acetic anhydride (17 g, 0.16 mole) was next added over a 20 minute period to the reaction mixture. The mixture was heated to 100° C. for one hour and then cooled to room temperature to produce a surfactant of the present invention. (Surfactant No. 1 of Table I below). (The acetic anhydride caps the hyroxyl end groups of the polyol with acetate groups.)

The above alkoxylated diamine used in the preparation of the surfactant of the invention has a molecular weight of 5500, has a weight ratio of ethylene oxide to propylene oxide of 40:60, and is available from the BASF Wyandotte Corporation, Wyandotte, Mich., U.S.A., under the tradename "TETRONIC 704."

Surfactant Nos. 2-36 of Table I below were prepared in a similar manner employing Tetronic 704, DBM and NVP in the same concentrations as utilized above and the initiators and metal catalysts listed in the table in the concentrations designated therein. All surfactants of Table I were in the form of liquids. Surfactant Nos. 1-33 are illustrative of the present invention, while Surfactant Nos. 34-36 are comparative surfactants illustrating the use of an azo initiator together with a metal catalyst of the invention. The azo initiator is the sole initiator in the production of Surfactant No. 36 and is used in combination with a peroxidic initiator in the production of Surfactant Nos. 34 and 35.

TABLE I

| | Preparation of Metal Catalyzed Surfactants | | | |
|---|---|---|---|---|
| | Initiator(s) | | Metal Salt(s) | |
| Surfactant No. | Type | Concentration (%)$^a$ | Type | Concentration (%)$^a$ |
| 1 | tert.-Butyl Perbenzoate | 2.4 | Ferrocene | 0.13 |
| 2 | tert.-Butyl Perbenzoate | 2.4 | Ferrocene | 0.13 |
| 3$^b$ | tert.-Butyl Perbenzoate | 2.3 | Ferrous Sulfate Ferric Sulfate | 0.2 0.2 |
| 4$^b$ | tert.-Butyl Perbenzoate | 0.6 | Ferrous Sulfate Ferric Chloride | 0.2 0.2 |
| 5$^b$ | tert.-Butyl Perbenzoate | 1.2 | Ferrous Sulfate Ferric Sulfate | 0.2 0.2 |
| 6$^b$ | tert.-Butyl Perbenzoate | 1.8 | Ferrous Sulfate Ferric Sulfate | 0.2 0.2 |
| 7$^b$ | tert.-Butyl Perbenzoate | 2.4 | Ferrous Sulfate Ferric Sulfate | 0.2 0.2 |
| 8 | tert.-Butyl Perbenzoate | 2.4 | Manganese (II) Acetylacetonate Manganese (III) Acetylacetonate | 0.2 0.2 |
| 9 | tert.-Butyl | 2.4 | Cobalt (II) | 0.2 |

TABLE I-continued
Preparation of Metal Catalyzed Surfactants

| Surfactant No. | Initiator(s) Type | Concentration (%)[a] | Metal Salt(s) Type | Concentration (%)[a] |
|---|---|---|---|---|
|  | Perbenzoate |  | Benzoate Cobalt (III) Acetylacetonate | 0.26 |
| 10 | tert.-Butyl Perbenzoate | 2.4 | Cuprous Acetate Cupric Acetylacetonate | 0.09 0.2 |
| 11 | tert.-Butyl Perbenzoate | 2.4 | Cupric Acetylacetonate | 0.2 |
| 12 | tert.-Butyl Perbenzoate | 2.4 | Vanadium (III) Acetylacetonate Vanadium (IV) Oxide Acetylacetonate | 0.2 0.2 |
| 13 | tert.-Butyl Perbenzoate | 2.4 | Ferrocene Ferric Acetylacetonate | 0.13 0.24 |
| 14 | tert.-Butyl Perbenzoate | 2.4 | Ferric Acetylacetonate | 0.24 |
| 15 | tert.-Butyl Perbenzoate | 2.4 | Ferrous Acetylacetonate | 0.2 |
| 16 | tert.-Butyl Perbenzoate | 2.4 | Ferrocene | 0.016 |
| 17 | tert.-Butyl Perbenzoate | 2.4 | Ferrocene | 0.008 |
| 18 | tert.-Butyl Perbenzoate | 2.4 | Ferrocene | 0.004 |
| 19 | tert.-Butyl Perbenzoate | 2.4 | Ferrocene | 0.002 |
| 20 | tert.-Butyl Perbenzoate | 2.4 | Ferrocene | 0.00016 |
| 21 | tert.-Butyl Perbenzoate | 2.4 | Ferrocene | 0.00008 |
| 22 | tert.-Butyl Perbenzoate | 2.4 | Ferrocene | 0.26 |
| 23 | tert.-Butyl Perbenzoate | 4.8 | Ferrocene | 0.26 |
| 24 | tert.-Butyl Perbenzoate | 4.8 | Ferrocene | 0.13 |
| 25 | tert.-Butyl Hydroperoxide | 1.2 | Ferrocene | 0.13 |
| 26 | tert.-Butyl Hydroperoxide | 1.2 | Ferrocene Ferric Acetylacetonate | 0.13 0.2 |
| 27 | Cumene Hydroperoxide | 1.76 | Ferrocene | 0.13 |
| 28 | Cumene Hydroperoxide | 1.76 | Ferrocene Ferric Acetylacetonate | 0.13 0.2 |
| 29 | Lauroyl Peroxide | 2.56 | Ferrocene | 0.13 |
| 30 | Lauroyl Peroxide | 2.56 | Ferrocene Ferric Acetylacetonate | 0.13 0.2 |
| 31 | Benzoyl Peroxide | 3.1 | Ferrocene | 0.13 |
| 32 | Di-tert.-Butyl Peroxide | 1.88 | Ferrocene | 0.13 |
| 33 | Dicumyl Peroxide | 3.44 | Ferrocene | 0.13 |
| 34 | tert.-Butyl Perbenzoate Azobisisobutyronitrile | 2.4 0.4 | Ferrocene | 0.13 |
| 35 | tert.-Butyl Perbenzoate Azobisisobutyronitrile | 0.2 0.4 | Ferrocene | 0.13 |
| 36 | Azobisisobutyronitrile | 2.1 | Ferrocene | 0.13 |

[a] The initiator and metal salt concentrations are each based on the total weight of the reaction mixture.
[b] In the preparation of Surfactant Nos. 3 to 7 a precipitate formed. The precipitate was separated from the surfactants by filtration through glass wool.

EXAMPLE 2

This example illustrates the synthesis of metal catalyzed surfactants of the invention utilizing "Pluronic" polyols (available from BASF Wyandotte Corporation) as the polyoxyalkylene adduct.

A. Method of Preparation

A 500 ml resin kettle equipped with an overhead stirrer was charged with a mixture of 200 g of a Pluronic polyol (listed in Table II below) and 0.33 g (0.0018 mole) of ferrocene. While stirring the mixture under nitrogen at a temperature of 90° C., 16 g (0.145 mole) of N-vinyl-2-pyrrolidinone (NVP) and 34 g (0.145 mole) of dibutyl maleate (DBM) were added separately from two addition funnels over two hours. 6 g (0.032 mole) of tert.-butyl perbenzoate (TBP) was dissolved in the dibutyl maleate prior to the addition. Following the addition, the temperature was increased to 140° C. for one hour. The mixture was then cooled to room temperature and the appropriate amount of acetic anhydride (determined from the polyol's hydroxyl number) was added to cap the polyol. The temperature was next increased to 100° C. for one hour, after which the surfactant product was cooled to room temperature. By following this procedure, surfactant Nos. 37–50 of the invention were prepared utilizing the Pluronic polyols presented in Table II.

B. Molecular Weight and Ethylene Oxide Content of Pluronics

The molecular weight and ethylene oxide content of the Pluronic polyols utilized in the preparation of Surfactant Nos. 37–50 are shown in the following Table II. For comparison, the molecular weight and ethylene oxide content of the Tetronic 704 adduct employed in Example 1 are also shown in the Table.

TABLE II
MOLECULAR WEIGHT AND ETHYLENE OXIDE CONTENT OF PLURONICS

| Surfactant No. | Physical Form | Polyol Utilized | Molecular Weight | Weight % Ethylene Oxide |
|---|---|---|---|---|
| 37 | liquid | Pluronic L35 | 1900 | 50 |
| 38 | liquid | Pluronic L43 | 1850 | 30 |
| 39 | liquid | Pluronic L44 | 2200 | 40 |
| 40 | liquid | Pluronic L63 | 2650 | 30 |
| 41 | liquid | Pluronic L64 | 2900 | 40 |
| 42 | paste | Pluronic P65 | 3400 | 50 |
| 43 | solid | Pluronic F68 | 8350 | 80 |
| 44 | liquid | Pluronic L72 | 2750 | 20 |
| 45 | paste | Pluronic P84 | 4200 | 40 |
| 46 | paste | Pluronic P85 | 4600 | 50 |
| 47 | solid | Pluronic F87 | 7700 | 70 |
| 48 | liquid | Pluronic P103 | 4950 | 30 |
| 49 | liquid | Pluronic L122 | 5000 | 20 |
| 50 | liquid | Pluronic L123 | 5750 | 30 |
| — | liquid | Tetronic 704 | 5500 | 40 |

The letters L, P, and F before the numbers in the designation of each Pluronic polyol of Table II represent the physical form of the polyol: liquid, paste or flaky solid. The last digit of the numbers represents the approximate weight percent of ethylene oxide contained in the polyol divided by 10.

EXAMPLE 3

This example illustrates the synthesis of a phenolic polymer of Formula VI useful in the present invention employing a molar ratio of phenol to ortho cresol of 4:1.

The following quantities of the following ingredients were combined as indicated.

| Item | Ingredient | Amount grams | moles |
|---|---|---|---|
| A | o-cresol | 6,901 | 63.9 |
| B | paraformaldehyde (93.5% HCHO) | 3,133 | 97.7 |
| C | sodium hydroxide (50% NaOH) | 215 | 2.69 |
| D | phenol | 24,025 | 255.5 |
| E | paraformaldehyde | 11,350 | 354.1 |
| F | sodium hydroxide (50% NaOH) | 215 | 2.69 |
| G | glacial acetic acid | 350 | 5.8 |

Items A and B were charged to a reaction vessel. Item C was added over a period of fifteen minutes, the temperature rose due to the exothermic reaction to 100° C. and was maintained at that level for 1.5 hours. Items D, E, and F are then added and the temperature maintained at 80° C. for 5 hours. Item G was then added and the contents of the reaction vessel are termed Resin C.

Resin C has a viscosity at 25° C. of 22,000 cps, a free phenol content of 9%, and a free water content of 10.9%, a free formaldehyde content of 1.1%, and a free o-cresol content of less than 0.1%.

EXAMPLE 4

This example illustrates the synthesis of foaming catalysts useful in the present invention.

The following quantities of the following ingredients were combined as indicated to produce Catalyst A:

| Item | Ingredients Name | Quantity grams |
|---|---|---|
| A | p-toluene sulfonic acid | 333 |
| B | xylene sulfonic acids | 333 |
| C | water | 333 |

Items A, B, and C were mixed. The resultant composition is termed Catalyst A.

The following quantities of the following ingredients were combined as indicated to produce Catalyst B:

| Item | Ingredients Name | Quantity grams |
|---|---|---|
| A | Ultra TX | 667 |
| B | water | 333 |

Items A and B were mixed. The resultant composition is termed Catalyst B. Ultra TX is a mixture of equal parts by weight of p-toluene sulfonic acid and xylene sulfonic acids available from the Witco Chemical Company.

EXAMPLE 5

This example illustrates the synthesis of foams based on 4:1 phenol:o-cresol resoles of the present invention.

| Item | Ingredient | grams |
|---|---|---|
| A | Resin C of Example 3 | 300 |
| B | $CFCl_3$ | 22.5 |
| C | $CFCl_2CF_2Cl$ | 22.5 |
| D | Surfactant (see Table III below) | 15 |
| E | Catalyst B of Example 4 | 35 |

Items A through E were mixed in an open vessel for 15–20 seconds. The mixture was then poured into a square paper box twelve inches by twelve inches by five inches tall. A foaming reaction ensued. After a period of 300–600 seconds the material was rigid. The box and contents were placed in an oven at 55° to 75° C. for a period of ten minutes to one hour.

The characteristics of the foams synthesized utilizing as surfactant various metal catalyzed surfactants of Example 1 and a surfactant prepared in accordance with U.S. Pat. No. 4,140,842 are shown in the following Table III.

TABLE III

Metal Catalyzed Surfactants in Resin C Foams

| Foam No. | Surfactant | Cell Structure* | k-factor/days |
|---|---|---|---|
| 1 | No. 1 of Example 1 | Fine | .122/1, .127/14, .130/70, .132/200, .139/365 |
| 2 | No. 3 of Example 1 | Fine | .127/1 |
| 3 | No. 4 of Example 1 | Fine | |
| 4 | No. 5 of Example 1 | Fine | |
| 5 | No. 6 of Example 1 | Fine | |
| 6 | No. 7 of Example 1 | Fine | |
| 7 | No. 8 of Example 1 | Fine | |
| 8 | No. 9 of Example 1 | Fine | |
| 9 | No. 34 of Example 1 | Fine | |
| 10 | No. 35 of Example 1 | Coarse | |
| 11 | No. 36 of Example 1 | Very Coarse | |
| 12 | Surfactant A** of U. S. Pat. No. 4,140,842 | Coarse | |

*The cell quality of the foams was determined by visual and microscopic examination.
**This surfactant was prepared as in Examples 3 and 4 of U. S. Pat. No. 4,140,842.

The results of Table III indicate that high quality foams (Foam Nos. 1 to 8 of the invention) are produced by employing surfactants which are prepared in the presence of a metal catalyst and a per-compound. However, when the surfactant is prepared in the presence of a metal catalyst and an azo initiator, a very poor quality foam (Foam No. 11) results. The quality of the foam is improved somewhat by replacing a portion of the azo initiator by a per-compound but the resultant foam (Foam No. 10) is still unacceptable. Only when a high proportion of the azo initiator is replaced by a per-compound is an acceptable foam (Foam No. 9) obtained. Table III also shows that an inferior foam (Foam No. 12) results when the surfactant utilized is manufactured by the process of U.S. Pat. No. 4,140,842, without the benefit of any metal catalysis.

EXAMPLE 6

The procedure of Example 1 utilized in the preparation of Surfactant No. 1 was repeated except that no metal catalyst was added to the reaction mixture. The viscous liquid surfactant obtained in this Example was utilized in the procedure of Example 5 and a fine-celled foam was produced.

EXAMPLE 7

This example illustrates the synthesis of a phenolic polymer of Formula VI useful in the present invention employing a molar ratio of phenol to o-cresol of 2:1.

The following quantities of the following ingredients were combined as indicated.

| Item | Ingredient | Amount grams | moles |
|---|---|---|---|
| A | o-cresol | 10,580 | 98 |
| B | paraformaldehyde (93.6%) | 4,743 | 148 |
| C | sodium hydroxide (50%) | 295 | 3.69 |
| D | phenol | 18,428 | 196 |
| E | paraformaldehyde | 7,917 | 247 |
| F | glacial acetic acid | 225 | 3.75 |

Items A and B were charged to a reaction vessel. Item C was added over a period of fifteen minutes, the temperature rose to 100° C. due to an exothermic reaction and was maintained at that level for 1 hour. Items D and E were then added and the temperature maintained at 80° C. for four and one-half hours. Item F was then added and the contents of the reaction are termed Resin B.

Resin B has a viscosity at 25° C. of 31,500 cps, a free phenol content of 8.5%, and a free water content of 10.5%, a free formaldehyde content of 1.2%, and a free o-cresol content of less than 0.1%.

EXAMPLE 8

This example illustrates the synthesis of foams based on 2:1 phenol:o-cresol resoles of the present invention. The following quantities of the following ingredients were combined as indicated below.

| Item | Ingredient | grams |
|---|---|---|
| A | Resin B of Example 7 | 300 |
| B | $CFCl_3$ | 22.5 |
| C | $CCl_2FCF_2Cl$ | 22.5 |
| D | Surfactant (See Table IV below) | |
| E | Catalyst B of Example 4 | 40 |

Items A through E were mixed at 15° C. in an open vessel for 15 seconds. The mixture was then poured into a square paper box twelve inches by twelve inches by five inches tall. A foaming reaction ensued. After a period of about 240–600 seconds the material was rigid. The box and contents were placed in an oven at 55° to 75° C. for a period of ten minutes to one hour. Properties of the foams are shown in the following Table IV.

TABLE IV

Metal Catalyzed Surfactants in Resin B Foams

Phenolic Foam Properties

| Surfactant[1] No. | Resin B[2] Viscosity[3], cps | Density, pcf | Friability, % wt. loss/10 min. | k-Factor Days 1 | 7 | 14 | 28 |
|---|---|---|---|---|---|---|---|
| 41 of Example 2 | 18,500 | | | .114 | .126 | .130 | .136 |
| " | 31,000 | 2.5 | 12 | .125 | .120 | .120 | .123 |
| " | " | | | .121 | .118 | .120 | .123 |
| " | " | | | .123 | .118 | .119 | .118 |
| 1 of Example 1 | 22,000 | | | .127 | .131 | .132 | .134 |
| " | 50,000 | | | .125 | .126 | .122 | .128 |

TABLE IV-continued

| Metal Catalyzed Surfactants in Resin B Foams | | | | | | | |
|---|---|---|---|---|---|---|---|
| | | | Phenolic Foam Properties | | | | |
| Surfactant[1] | Resin B[2] | Density, | Friability, % | k-Factor Days | | | |
| No. | Viscosity[3], cps | pcf | wt. loss/10 min. | 1 | 7 | 14 | 28 |
| " | " | 2.8 | 10 | .128 | .13 | .131 | .133 |

[1]5 phr of surfactant, based on the Resin B polymer weight, were used in each foam.
[2]Each Resin B of Table IV was prepared according to the procedure of Example 7.
[3]Brookfield viscosities at 25° C.

The Table IV results show that the metal catalyzed surfactants of the invention prepared from both Pluronic L64 (Surfactant No. 41) and Tetronic 704 (Surfactant No. 1) contribute to the production of phenolic foams having similarly low initial k-factors, low k-factor drift rates and low friabilities. However, the Pluronic-based surfactant has an advantage over the Tetronic-based one in large scale phenolic foam production wherein there is utilized a so-called "B-component" consisting of a solution of surfactant (5 phr) with a blowing agent combination of Freon 11 (2.5 phr) and Freon 113 (7.5 phr). While the Pluronic surfactant B-component mixture was a clear, stable solution, a combination of the Tetronic 704 surfactant with the blowing agents resulted in the formation of a cloudy precipitate.

EXAMPLE 9

By essentially following the foam production method of Example 8 and substituting the following surfactants of Table II for Surfactant Nos. 1 and 41 of Table IV, a series of phenolic foams based on 2:1 phenol:o-cresol resoles were produced. Properties of the foams are shown in the following Table V.

TABLE V

| Metal Catalyzed Surfactants in Resin B Foams | | | | | | | |
|---|---|---|---|---|---|---|---|
| | | | | Phenolic Foam Properties k-Factor | | | |
| Surfactant[1] | Resin B[2] | Density, | Friability, % | Days | | | |
| No. | Viscosity[3], cps | pcf | wt. loss/10 min. | 1 | 7 | 14 | 28 |
| 37 | <40,000 | 2.15 | 12 | .146 | .149 | .159 | .173 |
| | | | | .136 | .146 | | |
| 38 | <40,000 | 2.00 | 14 | .138 | .148 | .159 | .170 |
| | | | | .143 | .248 | | |
| 39 | 31,000 | 2.30 | 11 | .126 | .117 | .114 | .118 |
| | | | | .124 | .116 | .124 | .119 |
| 40 | 31,000 | 2.84 | 12 | .121 | .116 | .114 | .113 |
| | | | | .123 | .119 | .120 | .129 |
| 42 | 31,000 | 2.20 | 23 | .122 | .116 | .128 | .134 |
| 43 | 31,000 | 2.40 | 10 | .130 | .138 | .133 | .117 |
| | | | | .120 | .119 | .112 | |
| 44 | 13,000 | 1.55 | 14 | .170 | | | |
| | | | | .225 | | | |
| 45 | 31,000 | 2.70 | 11 | .125 | .118 | .119 | .118 |
| | | | | .126 | .117 | .116 | .116 |
| 46 | 31,000 | 2.20 | 21 | .123 | .120 | .124 | .143 |
| 47 | 31,000 | 2.27 | 18 | .123 | .127 | .113 | .116 |
| | | | | .118 | .119 | .116 | .121 |
| 49 | 9,000 | 1.75 | 15 | .137 | .214 | | |
| | | | | .139 | .179 | .198 | |
| 50 | <40,000 | 2.27 | 10 | .124 | .120 | .121 | .123 |

[1]5 phr of surfactant, based on the Resin B polymer weight, were used in each foam.
[2]Each Resin B of Table V was prepared according to the procedure of Example 7.
[3]Brookfield viscosities at 25° C.

As the data in Tables II and V show, metal catalyzed surfactants of the invention prepared from Pluronic polyols having an ethylene oxide content ranging from 30 to 80 weight % contributed to the production of good phenolic foams. All of these surfactants gave fine-celled, low k-factor Resin B foams. The two surfactants of Table V prepared from Pluronics containing 20 weight percent ethylene oxide (nos. 44 and 49) also gave fine-celled Resin B foams, but the foams displayed high initial k-factors. The high k-factor drift rates of the foams made with surfactants based on Pluronic L43 (MW-1850) and Pluronic L35 (MW-1900), i.e., Surfactants Nos. 38 and 37, respectively, point to the desirability of preparing the cell stabilizers of the invention from polyols with a molecular weight of at least ca. 2000, as e.g., Surfactant No. 39 (polyol MW-2200), which gave fine-celled, low k-factor Resin B foams with low drift rates.

EXAMPLE 10

This example illustrates the solvent extraction of metal catalyzed surfactants of the present invention and the utilization of the extract as surfactant in the synthesis of a foam based on a 2:1 phenol:o-cresol resole of the invention.

A. Solvent Extraction

Surfactant Nos. 1, 2, 19, and 34 of Example 1 and the surfactant of Example 6 were each separately extracted with hexane as follows:

A 50 or 100 g sample of the surfactant was placed into a 1 liter Erlenmeyer flask. Approximately 800 ml of hexane was added and the mixture was boiled, while being stirred, for 30 minutes. The mixture was allowed to stand at room temperature for 10 minutes and the hexane was decanted from an insoluble residue. The decanted hexane was evaporated in a vacuum leaving an extracted material. The process was repeated three times, yielding an insoluble residue as the major component and a viscous liquid extract from the decanted hexane as the minor component. The percent of each surfactant (minor component) which was extracted and the properties of phenolic foams which were synthesized utilizing these extracts as surfactant are shown in Table VI below.

B. Phenolic Foam Preparation

By essentially following the foam production method of Example 8 and substituting the following surfactants of Table VI for Surfactant Nos. 1 and 41 of Table IV, phenolic foams were produced having the properties shown in Table VI.

TABLE VI

Extracts of Surfactants in Resin B[1] Foams

| Surfactant Extracted[2] | Percent Extracted | Cell Structure | Phenolic Foam Properties | |
|---|---|---|---|---|
| | | | k-factor/ Days | Friability % wt. loss, 10 min. |
| No. 1 (Table I) | 14 | Fine | .125/1, .151/7, .156/14 | 17 |
| No. 2 (Table I) | 15 | Fine | .123/1, .131/14, .137/7, .142/21 | 21 |
| Surfactant of Example 6 | 13 | Coarse | | 50 |
| No. 19 (Table I) | 14 | Coarse | | 65 |
| No. 34 (Table I) | 17 | Very Coarse | | 30 |

[1]The Resin B polymer used in the phenolic foam preparations had a Brookfield viscosity at 25° C. of 20,000 (cps).
[2]5 phr of surfactant, based on the Resin B polymer weight, were used in each foam.

The Table VI results indicate that the extracted surfactant's ability to stabilize phenolic foams can be improved by preparing the surfactant in the presence of (1) a ferrocene amount greater than 0.002 g/100 g polyol, (2) a tert.-butyl perbenzoate-ferrocene system rather than tert.-butyl perbenzoate alone, and (3) a tert.-butyl perbenzoate-ferrocene system uncombined with any azobisisobutyronitrile.

Whereas the present invention has been described with respect to specific embodiments thereof, it should be understood that the invention is not limited thereto, as many modifications thereof may be made. It is, therefore, contemplated to cover by the present application any and all such modifications as fall within the true spirit and scope of the appended claims.

I claim:

1. A process for preparing a surfactant for cellular foams comprising reacting a cyclic nitrogenous vinyl monomer and an esterified unsaturated dibasic acid by free radical addition polymerization in the presence of (a) a polyoxyalkylene adduct having the formula

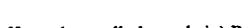

wherein R is an organic or inorganic radical and t is the number of polyoxyalkylene chains reacted onto R, (b) an organic or inorganic per-compound, and
(c) a metal catalyst selected from the group consisting of ferrocene, acetylferrocene, benzoylferrocene, cobaltocene, 1,1'-diacetylferrocene, 1,1'-ferrocene-bis-(diphenyl-phosphine), nickelocene, hafnocene dichloride, ferrocenecarboxaldehyde, mixtures of said ferrocene compounds and other transition metal compounds containing a metal having an atomic number of 21 to 30, and a mixture of compounds selected from the group consisting of iron (II) sulfate and iron (III) sulfate, iron (II) sulfate and iron (III) chloride, manganese (II) acetylacetonate and manganese (III) acetylacetonate, cobalt (II) benzoate and cobalt (III) acetylacetonate, copper (I) acetate and copper (II) acetylacetonate, and vanadium (III) acetylacetonate and vanadium (IV) oxide acetylacetonate, to provide a foam surfactant composition, wherein the major component of said foam surfactant composition comprises the product formed from the reaction of said cyclic nitrogenous vinyl monomer and unsaturated diester onto said polyoxyalkylene adduct.

2. The process of claim 1 wherein the cyclic nitrogenous vinyl monomer has the formula

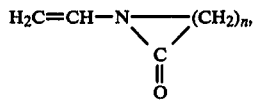

wherein n is 3, 4, or 5, and the esterified unsaturated dibasic acid contains 4 or 5 carbon atoms in the acid portion.

3. The process of claim 2 wherein the esterified unsaturated dibasic acid has the formula

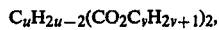

wherein u is 2 or 3 and v is an integer from 3 to 18.

4. The process of claim 3 wherein the esterified unsaturated dibasic acid is a member selected from the group consisting of dibutyl fumarate, dibutyl maleate, dihexyl fumarate, diamyl methylenemalonate, dipropyl itaconate, and dibutyl itaconate.

5. The process of claim 4 wherein the cyclic nitrogenous vinyl monomer is N-vinyl-2-pyrrolidinone and the esterified unsaturated dibasic acid is dibutyl maleate.

6. The process of claim 3 wherein the per-compound is a member selected from the group consisting of an organic peroxide and an organic hydroperoxide, and the metal catalyst is a member selected from the group consisting of ferrocene, mixtures of ferrocene and other transition metal compounds containing a metal having an atomic number of 21 to 30, a mixture of manganese (II) acetylacetonate and manganese (III) acetylacetonate, and a mixture of cobalt (II) benzoate and cobalt (III) acetylacetonate.

7. The process of claim 6 wherein the metal catalyst is ferrocene.

8. The process of claim 1 wherein t is an integer from 1 to 50 and the molecular weight of the polyoxyalkylene adduct is above about 1000.

9. The process of claim 1 wherein the polyoxyalkylene chain or chains of the adduct are derived from an alkylene oxide selected from the group consisting of ethylene oxide, 1,2-epoxypropane, an epoxybutane, and mixtures thereof.

10. The process of claim 1 wherein the polyoxyalkylene adduct is treated either before or after the free radical addition polymerization with a capping agent capable of reacting with the hydroxyl groups of said adduct, whereby the hydroxyl number of said adduct is reduced to less than 50.

11. The process of claim 10 wherein the polyoxyalkylene chain or chains of the adduct are derived from an alkylene oxide selected from the group consisting of ethylene oxide, 1,2-epoxypropane, an epoxybutane, and mixtures thereof.

12. The process of claim 10 wherein the hydroxyl number of said adduct is reduced to less than 10.

13. The process of claim 12 wherein the per-compound is a member selected from the group consisting of an organic peroxide and an organic hydroperoxide, and the metal catalyst is a member selected from the group consisting of ferrocene, mixtures of ferrocene and other transition metal compounds containing a metal having an atomic number of 21 to 30, a mixture of manganese (II) acetylacetonate and manganese (III) acetylacetonate, and a mixture of cobalt (II) benzoate and cobalt (III) acetylacetonate.

14. The process of claim 13 wherein the metal catalyst is ferrocene.

15. The process of claim 10 wherein the capping agent is acetic anhydride.

16. The process of claim 1 wherein the per-compound is a member selected from the group consisting of an organic peroxide and an organic hydroperoxide.

17. The process of claim 1 wherein the per-compound is a member selected from the group consisting of tert.-butyl perbenzoate, tert.-butyl hydroperoxide, cumene hydroperoxide, lauroyl peroxide, benzoyl peroxide, di-tert.-butyl peroxide and dicumyl peroxide.

18. The process of claim 1 wherein the metal catalyst is a mixture of compounds selected from the group consisting of iron (II) sulfate and iron (III) sulfate; iron (II) sulfate and iron (III) chloride; manganese (II) acetylacetonate and manganese (III) acetylacetonate; cobalt (II) benzoate and cobalt (III) acetylacetonate; copper (I) acetate and copper (II) acetylacetonate; and vanadium (III) acetylacetonate and vanadium (IV) oxide acetylacetonate.

19. The process of claim 1 wherein the metal catalyst is a member selected from the group consisting of ferrocene, acetylferrocene, benzoylferrocene, cobaltocene, 1,1'-diacetylferrocene, 1,1'-ferrocenebis-(diphenylphosphine), nickelocene, hafnocene dichloride, and ferrocenecarboxaldehyde.

20. The process of claim 1 wherein the metal catalyst is ferrocene.

21. The process of claim 20 wherein the per-compound is tert.-butyl perbenzoate.

22. The process of claim 1 wherein the cyclic nitrogenous vinyl monomer and esterified unsaturated dibasic acid together comprise between about 5 and 40 weight percent of the copolymerization reaction mixture, the per-compound comprises from about 2 to 30 weight percent, based on the total weight of cyclic nitrogenous vinyl monomer and esterified unsaturated dibasic acid, and the metal catalyst comprises from about 0.001 to 0.06 grams per gram of per-compound.

23. The process of claim 22 wherein the molar ratio of cyclic nitrogenous vinyl monomer to esterified unsaturated dibasic acid is 1:1.

24. The process of claim 22 wherein the per-compound is a member selected from the group consisting of an organic peroxide and an organic hydroperoxide, and the metal catalyst is a member selected from the group consisting of ferrocene, mixtures of ferrocene and other transition metal compounds containing a metal having an atomic number of 21 to 30, a mixture of manganese (II) acetylacetonate and manganese (III) acetylacetonate, and a mixture of cobalt (II) benzoate and cobalt (III) acetylacetonate.

25. The process of claim 24 wherein the metal catalyst is ferrocene.

26. The process of claim 1 wherein
(a) the cyclic nitrogenous vinyl monomer has the formula

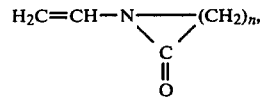

wherein n is 3, 4, or 5, (b) the esterified unsaturated dibasic acid has the formula

wherein u is 2 or 3 and v is an integer from 3 to 18, (c) the polyoxyalkylene adduct has a molecular weight above about 1000 and is an alkylene oxide adduct of a member selected from the group consisting of a monohydroxyalkane, a polyhydroxyalkane, a monohydroxycycloalkane, a polyhydroxycycloalkane, an alkanolamine, a monoamine, a polyamine, a non-reducing sugar, a non-reducing sugar derivative, an aromatic amine/phenol/aldehyde condensation product, a phosphorus acid, a polyphosphorus acid, a monohydric phenol, a polyhydric phenol, an amide, an organic carboxylic acid, and a hydroxyl containing triglyceride, and a polysiloxane, said polyoxyalkylene adduct being treated either before or after the free radical addition polymerization with a capping agent capable of reacting with the hydroxyl groups of said adduct, whereby the hydroxyl number of said adduct is reduced to less than 50, (d) the alkylene oxide employed in the adduct formation is a member selected from the group consisting of ethylene oxide, 1,2-epoxypropane, an epoxybutane, and mixtures thereof, and (e) the per-compound is a member selected from the group consisting of an organic peroxide and an organic hydroperoxide.

27. The process of claim 26 wherein
(a) the cyclic nitrogenous vinyl monomer is N-vinyl-2-pyrrolidinone,
(b) the esterified unsaturated dibasic acid is dibutyl maleate,
(c) the polyoxyalkylene adduct is a capped alkoxylated amine having the formula:

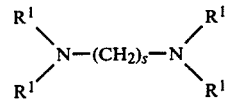

wherein $R^1$ is independently an alkoxylated chain having the formula:

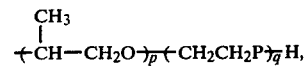

s is an integer from 2 to 10 inclusive and the ratio p:q is from 10:90 to 90:10, the molecular weight of said alkoxylated amine being from about 1500 to 6000, (d) the per-compound is a member selected from the group consisting of tert.-butyl perbenzoate, tert.-butyl hydroperoxide, cumene hydroperoxide, lauroyl peroxide, benzoyl peroxide, di-tert.-butyl peroxide and dicumyl peroxide, and (e) the metal catalyst is a member selected from the group consisting of ferrocene, and mixtures of metal catalysts selected from the group consisting of iron (II) sulfate and iron (III) sulfate; iron (II) sulfate and iron (III) chloride; manganese (II) acetylacetonate and manganese (III) acetylacetonate; cobalt (II) benzoate and cobalt (III) acetylacetonate; copper (I) acetate and copper (II) acetylacetonate; and vanadium (III) acetylacetonate and vanadium (IV) oxide acetylacetonate.

28. The process of claim 27 wherein the per-compound is tert.-butyl perbenzoate and the metal catalyst is ferrocene.

29. The process of claim 26 wherein
(a) the cyclic nitrogenous vinyl monomer is N-vinyl-2-pyrrolidinone,
(b) the esterified unsaturated dibasic acid is dibutyl maleate,
(c) the polyoxyalkylene adduct is a capped linear block copolymer of ethylene oxide and propylene oxide, the molecular weight of said block copolymer being above about 2000 and the ethylene oxide content being from about 30 to 80 weight percent,
(d) the per-compound is a member selected from the group consisting of tert.-butyl perbenzoate, tert.-butyl hydroperoxide, cumene hydroperoxide, lauroyl peroxide, benzoyl peroxide, di-tert.-butyl peroxide and dicumyl peroxide, and
(e) the metal catalyst is a member selected from the group consisting of ferrocene, and mixtures of metal catalysts selected from the group consisting of iron (II) sulfate and iron (III) sulfate; iron (II) sulfate and iron (III) chloride; manganese (II) acetylacetonate and manganese (III) acetylacetonate; cobalt (II) benzoate and cobalt (III) acetylacetonate; copper (I) acetate and copper (II) acetylacetonate; and vanadium (III) acetylacetonate and vanadium (IV) oxide acetylacetonate.

30. The process of claim 29 wherein the per-compound is tert.-butyl perbenzoate and the metal catalyst is ferrocene.

31. The process of claim 26, wherein the cyclic nitrogenous vinyl monomer and esterified unsaturated dibasic acid together comprise between about 5 and 40 weight percent of the polymerization reaction mixture, the per-compound comprises from about 2 to 30 weight percent, based on the moles of cyclic nitrogenous vinyl monomer and esterified unsaturated dibasic acid, and the metal catalyst comprises from about 0.001 to 0.06 grams per gram of per-compound.

32. The process of claim 31 wherein the N-vinyl-2-pyrrolidinone and dibutyl maleate together comprise about 20 weight percent of the polymerization reaction mixture and the molar ratio of N-vinyl-2-pyrrolidinone to dibutyl maleate is about 1:1.

33. The process of claim 1 wherein the per-compound is a member selected from the group consisting of an organic peroxide and an organic hydroperoxide, and the metal catalyst is a member selected from the group consisting of ferrocene, mixtures of ferrocene and other transition metal compounds containing a metal having an atomic number of 21 to 30, a mixture of manganese (II) acetylacetonate and manganese (III) acetylacetonate, and a mixture of cobalt (II) benzoate and cobalt (III) acetylacetonate.

34. The process of claim 33 wherein the metal catalyst is ferrocene.

35. A surfactant for cellular foams comprising the product of a free radical addition polymerization of a cyclic nitrogenous vinyl monomer and an esterified unsaturated dibasic acid in the presence of (a) a polyoxyalkylene adduct having the formula

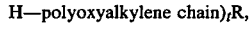

wherein R is an organic or inorganic radical and t is the number of polyoxyalkylene chains reacted onto R, (b) an organic or inorganic per-compound and (c) a metal catalyst selected from the group consisting of ferrocene, acetylferrocene, benzoylferrocene, cobaltocene, 1,1'-diacetylferrocene, 1,1'-ferrocene-bis-(diphenyl-phosphine), nickelocene, hafnocene dichloride, ferrocenecarboxaldehyde, mixtures of said ferrocene compounds and other transition metal compounds containing a metal having an atomic number of 21 to 30, and a mixture of compounds selected from the group consisting of iron (II) sulfate and iron (III) sulfate, iron (II) sulfate and iron (III) chloride, manganese (II) acetylacetonate and manganese (III) acetylacetonate, cobalt (II) benzoate and cobalt (III) acetylacetonate, copper (I) acetate and copper (II) acetylacetonate, and vanadium (III) acetylacetonate and vanadium (IV) oxide acetylacetonate, wherein the major component of said polymerization comprises the product formed from the reaction of said cyclic nitrogenous vinyl monomer and unsaturated diester onto said polyoxyalkylene adduct.

36. The surfactant of claim 35 wherein the cyclic nitrogenous vinyl monomer has the formula

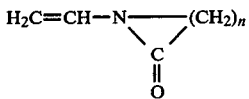

wherein n is 3, 4, or 5, and the esterified unsaturated dibasic acid contains 4 or 5 carbon atoms in the acid portion.

37. The surfactant of claim 36 wherein the esterified unsaturated dibasic acid has the formula

wherein u is 2 or 3 and v is an integer from 3 to 18.

38. The surfactant of claim 37 wherein the esterified unsaturated dibasic acid is a member selected from the group consisting of dibutyl fumarate, dibutyl maleate, dihexyl fumarate, diamyl methylenemalonate, dipropyl itaconate, and dibutyl itaconate.

39. The surfactant of claim 38 wherein the cyclic nitrogenous vinyl monomer is N-vinyl-2-pyrrolidinone and the esterified unsaturated dibasic acid is dibutyl maleate.

40. The surfactant of claim 37 wherein the per-compound is a member selected from the group consisting of an organic peroxide and an organic hydroperoxide, and the metal catalyst is a member selected from the group consisting of ferrocene, mixtures of ferrocene and other transition metal compounds containing a metal having an atomic number of 21 to 30, a mixture of manganese (II) acetylacetonate and manganese (III) acetylacetonate, and a mixture of cobalt (II) benzoate and cobalt (III) acetylacetonate.

41. The surfactant of claim 40 wherein the metal catalyst is ferrocene.

42. The surfactant of claim 35 wherein t is an integer from 1 to 8 and the molecular weight of the polyoxyalkylene adduct is above about 1000.

43. The surfactant of claim 35 wherein the polyoxyalkylene chain or chains of the adduct are derived from an alkylene oxide selected from the group consisting of ethylene oxide, 1,2-epoxypropane, an epoxybutane, and mixtures thereof.

44. The surfactant of claim 35 wherein the polyoxyalkylene adduct is treated either before or after the free radical addition polymerization with a capping agent capable of reacting with the hydroxyl groups of said adduct, whereby the hydroxyl number of said adduct is reduced to less than 50.

45. The surfactant of claim 44 wherein the polyoxyalkylene chain or chains of the adduct are derived from an alkylene oxide selected from the group consisting of ethylene oxide, 1,2-epoxypropane, an epoxybutane and mixtures thereof.

46. The surfactant of claim 44 wherein the hydroxyl number of said adduct is reduced to less than 10.

47. The surfactant of claim 46 wherein the per-compound is a member selected from the group consisting of an organic peroxide and an organic hydroperoxide, and the metal catalyst is a member selected from the group consisting of ferrocene, mixtures of ferrocene and other transition metal compounds containing a metal having an atomic number of 21 to 30, a mixture of manganese (II) acetylacetonate and manganese (III) acetylacetonate, and a mixture of cobalt (II) benzoate and cobalt (III) acetylacetonate.

48. The surfactant of claim 47 wherein the metal catalyst is ferrocene.

49. The surfactant of claim 44 wherein the capping agent is acetic anhydride.

50. The surfactant of claim 35 wherein the per-compound is a member selected from the group consisting of an organic peroxide and an organic hydroperoxide.

51. The surfactant of claim 35 wherein the per-compound is a member selected from the group consisting of tert.-butyl perbenzoate, tert.-butyl hydroperoxide, cumene hydroperoxide, lauroyl peroxide, benzoyl peroxide, di-tert.-butyl peroxide and dicumyl peroxide.

52. The surfactant of claim 35 wherein the metal catalyst is a mixture of compounds selected from the group consisting of iron (II) sulfate and iron (III) sulfate; iron (II) sulfate and iron (III) chloride; manganese (II) acetylacetonate and manganese (III) acetylacetonate; cobalt (II) benzoate and cobalt (III) acetylacetonate; copper (I) acetate and copper (II) acetylacetonate; and vanadium (III) acetylacetonate and vanadium (IV) oxide acetylacetonate.

53. The surfactant of claim 35 wherein the metal catalyst is a member selected from the group consisting of ferrocene, acetylferrocene, benzoylferrocene, cobaltocene, 1,1'-diacetylferrocene, 1,1'-ferrocenebis-(diphenylphosphine), nickelocene, hafnocene dichloride, and ferrocenecarboxaldehyde.

54. The surfactant of claim 35 wherein the metal catalyst is ferrocene.

55. The surfactant of claim 54 wherein the per-compound is tert.-butyl perbenzoate.

56. The surfactant of claim 35 wherein the cyclic nitrogenous vinyl monomer and esterified unsaturated dibasic acid together comprise between about 5 and 40 weight percent of the polymerization reaction mixture, the per-compound comprises from about 2 to 30 weight percent, based on the total weight of cyclic nitrogenous vinyl monomer and esterified unsaturated dibasic acid, and the metal catalyst comprises from about 0.001 to 0.05 grams per gram of per-compound.

57. The surfactant of claim 56 wherein the cyclic nitrogenous vinyl monomer and esterified unsaturated dibasic acid together comprise about 20 weight percent of the polymerization reaction mixture and the molar ratio of cyclic nitrogenous vinyl monomer to esterified unsaturated dibasic acid is about 1:1.

58. The surfactant of claim 56 wherein the per-compound is a member selected from the group consisting of an organic peroxide and an organic hydroperoxide, and the metal catalyst is a member selected from the group consisting of ferrocene, mixtures of ferrocene and other transition metal compounds containing a metal having an atomic number of 21 to 30, a mixture of manganese (II) acetylacetonate and manganese (III) acetylacetonate, and a mixture of cobalt (II) benzoate and cobalt (III) acetylacetonate.

59. The surfactant of claim 58 wherein the metal catalyst is ferrocene.

60. The surfactant of claim 35 wherein
(a) the cyclic nitrogenous vinyl monomer has the formula

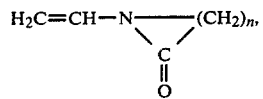

wherein n is 3, 4, or 5,
(b) the esterified unsaturated dibasic acid has the formula

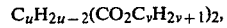

wherein u is 2 or 3 and v is an integer from 3 to 6,
(c) the polyoxyalkylene adduct has a molecular weight above about 1000 and is an alkylene oxide adduct of a member selected from the group consisting of a monohydroxyalkane, a polyhydroxyalkane, a monohydroxycycloalkane, a polyhydroxycycloalkane, an alkanolamine, a monoamine, a polyamine, a non-reducing sugar, a non-reducing sugar derivative, an aromatic amine/phenol/aldehyde condensation product, a phosphorus acid, a polyphosphorus acid, a monohydric phenol, a polyhydric phenol, an amide, an organic carboxylic acid, and a hydroxyl containing triglyceride, and a polysiloxane, said polyoxyalkylene adduct being treated either before or after the free radical addition polymerization with a capping agent capable of reacting with the hydroxyl groups of said adduct, whereby the hydroxyl number of said adduct is reduced to less than 50,
(d) the alkylene oxide employed in the adduct formation is a member selected from the group consisting of ethylene oxide, 1,2-epoxypropane, an epoxybutane, and mixtures thereof, and (e) the per-compound is a member selected from the group consisting of an organic peroxide and an organic hydroperoxide.

61. The surfactant of claim 60 wherein
(a) the cyclic nitrogenous vinyl monomer is N-vinyl-2-pyrrolidinone,
(b) the esterified unsaturated dibasic acid is dibutyl maleate,
(c) the polyoxyalkylene adduct is a capped alkoxylated amine having the formula:

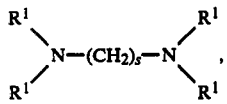

wherein $R^1$ is independently an alkoxylated chain having the formula:

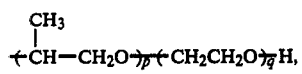

s is an integer from 2 to 10 inclusive and the ratio p:q is from 10:90 to 90:10, the molecular weight of said alkoxylated amine being from about 1500 to 6000,
(d) the per-compound is a member selected from the group consisting of tert.-butyl perbenzoate, tert.-butyl hydroperoxide, cumene hydroperoxide, lauroyl peroxide, benzoyl peroxide, di-tert.-butyl peroxide and dicumyl peroxide, and
(e) the metal catalyst is a member selected from the group consisting of ferrocene, and mixtures of metal catalysts selected from the group consisting of iron (II) sulfate and iron (III) sulfate; iron (II) sulfate and iron (III) chloride; manganese (II) acetylacetonate and manganese (III) acetylacetonate; cobalt (II) benzoate and cobalt (III) acetylacetonate; copper (I) acetate and copper (II) acetylacetonate; and vanadium (III) acetylacetonate and vanadium (IV) oxide acetylacetonate.

62. The surfactant of claim 61 wherein the per-compound is tert.-butyl perbenzoate and the metal catalyst is ferrocene.

63. The surfactant of claim 60 wherein
(a) the cyclic nitrogenous vinyl monomer is N-vinyl-2-pyrrolidinone,
(b) the esterified unsaturated dibasic acid is dibutyl maleate,
(c) the polyoxyalkylene adduct is a capped linear block copolymer of ethylene oxide and propylene oxide, the molecular weight of said block copolymer being above about 2000 and the ethylene oxide content being from about 30 to 80 weight percent,
(d) the per-compound is a member selected from the group consisting of tert.-butyl perbenzoate, tert.-butyl hydroperoxide, cumene hydroperoxide, lauroyl peroxide, benzoyl peroxide, di-tert.-butyl peroxide and dicumyl peroxide, and
(e) the metal catalyst is a member selected from the group consisting of ferrocene, and mixtures of metal catalysts selected from the group consisting of iron (II) sulfate and iron (III) sulfate; iron (II) sulfate and iron (III) chloride; manganese (II) acetylacetonate and manganese (III) acetylacetonate; cobalt (II) benzoate and cobalt (III) acetylacetonate; copper (I) acetate and copper (II) acetylacetonate; and vanadium (III) acetylacetonate and vanadium (IV) oxide acetylacetonate.

64. The surfactant of claim 63 wherein the per-compound is tert.-butyl perbenzoate and the metal catalyst is ferrocene.

65. The surfactant of claim 60 wherein the cyclic nitrogenous vinyl monomer and esterified unsaturated dibasic acid together comprise between about 5 and 40 weight percent of the polymerization reaction mixture, the per-compound comprises from about 2 to 30 weight percent, based on the total weight of cyclic nitrogenous vinyl monomer and esterified unsaturated dibasic acid, and the metal catalyst comprises from about 0.001 to 0.06 grams per gram of per-compound.

66. The surfactant of claim 65 wherein the N-vinylpyrrolidinone and dibutyl maleate together comprise about 20 weight percent of the polymerization reaction mixture and the molar ratio of N-vinyl-2-pyrrolidinone to dibutyl maleate is about 1:1.

67. The surfactant of claim 65 wherein the metal catalyst is ferrocene.

68. The surfactant of claim 35 wherein the per-compound is a member selected from the group consisting of an organic peroxide and an organic hydroperoxide, and the metal catalyst is a member selected from the group consisting of ferrocene, mixtures of ferrocene and other transition metal compounds containing a metal having an atomic number of 21 to 30, a mixture of manganese (II) acetylacetonate and manganese (III) acetylacetonate, and a mixture of cobalt (II) benzoate and cobalt (III) acetylacetonate.

69. The surfactant of claim 68 wherein the metal catalyst is ferrocene.

* * * * *